US009723063B2

(12) United States Patent
Reza (10) Patent No.: US 9,723,063 B2
(45) Date of Patent: Aug. 1, 2017

(54) METHOD OF DETERMINING TRANSPORT PARAMETERS FOR EFFICIENT DATA TRANSPORT ACROSS A NETWORK

(71) Applicant: XINLAB, INC., Milpitas, CA (US)

(72) Inventor: Areef Reza, Ottawa (CA)

(73) Assignee: VUCLIP (SINGAPORE) PTE. LTD., Singapore (SG)

( * ) Notice: Subject to any disclaimer, the term of this patent is extended or adjusted under 35 U.S.C. 154(b) by 200 days.

(21) Appl. No.: 14/361,275

(22) PCT Filed: Nov. 28, 2012

(86) PCT No.: PCT/CA2012/050857
§ 371 (c)(1),
(2) Date: May 28, 2014

(87) PCT Pub. No.: WO2013/078558
PCT Pub. Date: Jun. 6, 2013

(65) Prior Publication Data
US 2014/0310382 A1  Oct. 16, 2014

Related U.S. Application Data

(60) Provisional application No. 61/564,127, filed on Nov. 28, 2011.

(51) Int. Cl.
*G06F 15/16* (2006.01)
*H04L 29/08* (2006.01)
(Continued)

(52) U.S. Cl.
CPC ............ *H04L 67/10* (2013.01); *H04L 67/06* (2013.01); *H04L 69/28* (2013.01); *H04L 69/40* (2013.01);
(Continued)

(58) Field of Classification Search
CPC ......... H04L 67/06; H04L 67/10; H04L 69/28; H04L 69/40; H04N 21/2402; H04N 21/44209; H04N 21/6373; H04N 21/64322
See application file for complete search history.

(56) References Cited

U.S. PATENT DOCUMENTS 6,161,123 A * 12/2000 Renouard ............... H04L 29/06
  709/203
6,327,242 B1 * 12/2001 Amicangioli ....... H04L 67/2814
  370/216
(Continued)

FOREIGN PATENT DOCUMENTS

| EP | 2 148 479 | 1/2010 |
| EP | 2 202 888 | 6/2010 |
| WO | 2007/095550 | 8/2007 |

OTHER PUBLICATIONS

International Search Report for PCT/CA2012/050857 mailed Mar. 19, 2013.

*Primary Examiner* — Ario Etienne
*Assistant Examiner* — Thorne E Waugh
(74) *Attorney, Agent, or Firm* — Lynn C. Schumacher; Stephen W. Leonard; Hill & Schumacher (57) ABSTRACT

Methods are provided for determining, based on input parameters associated with a computing device and a network over which the computing device is connected to another computing device (such as a server), suitable transport parameters for requesting and receiving data, where the transport parameters are determined for efficient transmission with less susceptibility to interruptions and delays. The input parameters may be provided continuously in order to determine, on a real-time or near real-time basis, continuously updated transport parameters. Transport parameters may be rewarded and/or punished based on historical network data. Accordingly, embodiments enable the computing device and/or server to dynamically adjust transport parameters to provide a data rate that is chosen to accommodate changing network conditions.

23 Claims, 5 Drawing Sheets

(51) Int. Cl.
  *H04L 29/14*    (2006.01)
  *H04L 29/06*    (2006.01)
  *H04N 21/24*    (2011.01)
  *H04N 21/442*   (2011.01)
  *H04N 21/6373*  (2011.01)
  *H04N 21/643*   (2011.01)

(52) U.S. Cl.
  CPC ... *H04N 21/2402* (2013.01); *H04N 21/44209* (2013.01); *H04N 21/6373* (2013.01); *H04N 21/64322* (2013.01)

(56) References Cited

U.S. PATENT DOCUMENTS

| | | | | |
|---|---|---|---|---|
| 6,816,899 B1* | 11/2004 | Meah | ................ | H04L 29/06 370/252 |
| 6,832,239 B1* | 12/2004 | Kraft | ................ | H04L 67/06 709/203 |
| 7,003,775 B2* | 2/2006 | Lacombe | ............ | G06F 11/0757 713/502 |
| 7,200,632 B1* | 4/2007 | Greschler | ............... | H04L 67/34 709/203 |
| 7,631,169 B2* | 12/2009 | Darrington | ......... | G06F 11/0724 712/220 |
| 7,689,875 B2* | 3/2010 | Cahill | ................. | G06F 11/0757 714/23 |
| 8,448,029 B2* | 5/2013 | Snead | ................. | G06F 11/0724 714/55 |
| 8,477,612 B2* | 7/2013 | Oku | ....................... | H04L 12/14 370/230 |
| 2002/0078203 A1* | 6/2002 | Greschler | .......... | G06F 9/44526 709/225 |
| 2006/0159098 A1* | 7/2006 | Munson | ................. | H04L 47/10 370/394 |
| 2008/0108348 A1* | 5/2008 | Kottilingal | ........... | H04W 28/18 455/435.1 |
| 2012/0131639 A1* | 5/2012 | Alex | ................... | H04L 63/0892 726/3 |

* cited by examiner

METHOD OF DETERMINING TRANSPORT PARAMETERS FOR EFFICIENT DATA TRANSPORT ACROSS A NETWORK

CROSS-REFERENCE TO RELATED APPLICATION

This application is a National Phase application claiming the benefit of PCT/CA2012/050857 filed on Nov. 28, 2012, in English, which further claims priority to U.S. Provisional Application No. 61/564,127, titled "METHOD OF DETERMINING TRANSPORT PARAMETERS FOR EFFICIENT DATA TRANSPORT ACROSS A NETWORK" and filed on Nov. 28, 2011, the entire contents of which are incorporated herein by reference.

BACKGROUND

The present disclosure relates to methods of transferring data across a network. More particularly, the present disclosure relates to methods of efficiently transferring time-sensitive data across a network from a server to a client.

For many applications that depend on the timely delivery of data from a server, it can be very important to receive data as rapidly as possible through a network connection. A video streaming application is one example of such an application. When streaming video data from a server to a playback device, delays in receiving video data can result in the pausing of video playback, resulting in poor user experience. Such delays can occur, for example, as a result of a loss of network connection, unavailability of network resources, network congestion, and network policy for data services.

One approach for avoid delays when transferring time-sensitive data is to deliver a large block of the data at once, for example, by transferring a large block of data in a single file (i.e. in a single HTTP request) over given network connection. However, transmitting a large data block over a given network connection may also result in transmission problems due to network timeout. Accordingly, this can also result in delays that contribute to a poor user experience.

SUMMARY

Methods are provided for determining, based on input parameters associated with a computing device and a network over which the computing device is connected to another computing device (such as a server), suitable transport parameters for requesting and receiving data, where the transport parameters are determined for efficient transmission with less susceptibility to interruptions and delays. The input parameters may be provided continuously in order to determine, on a real-time or near real-time basis, continuously updated transport parameters. Transport parameters may be rewarded and/or punished based on historical network data. Accordingly, embodiments enable the computing device and/or server to dynamically adjust transport parameters to provide a data rate that is chosen to accommodate changing network conditions.

Accordingly, in a first aspect, there is provided a computer implemented method of configuring a first computing device for transmitting data across a network between a second computing device and the first computing device, the method comprising the steps of: determining one or more input parameters that affect an average data transmission rate between the second computing device and the first computing device; and processing the input parameters to determine one or more transport parameters associated with the transmission of data between the second computing device and the first computing device; wherein the transport parameters are determined such that the data is received by the first computing device with reduced susceptibility to interruption.

In another aspect, there is provided a computer-readable storage medium comprising instructions for configuring a first computing device for transmitting data across a network between a second computing device and the first computing device, wherein execution of the instructions by one or more processors causes the one or more processors to carry out the steps of: determining one or more input parameters that affect an average data transmission rate between the second computing device and the first computing device; and processing the input parameters to determine one or more transport parameters associated with the transmission of data between the second computing device and the first computing device; wherein the transport parameters are determined such that the data is received by the first computing device with reduced susceptibility to interruption.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

Embodiments described herein provide methods for determining, based on input parameters associated with a computing device and a network over which the computing device is connected to another computing device (such as a server), suitable transport parameters for requesting and receiving data, where the transport parameters are determined for efficient transmission with less susceptibility to interruptions and delays. The input parameters may be provided continuously in order to determine, on a real-time or near real-time basis, continuously updated transport parameters. Transport parameters may be "rewarded" or "punished" based on the results of previous attempts to receive data as per a transport request.

Accordingly, embodiments enable the computing device and/or server to dynamically adjust transport parameters to provide a data rate that is chosen to accommodate changing network conditions. As shown in the examples below, the methods may be employed for determining suitable parameters for requesting and downloading data over HTTP.

Figure 1:
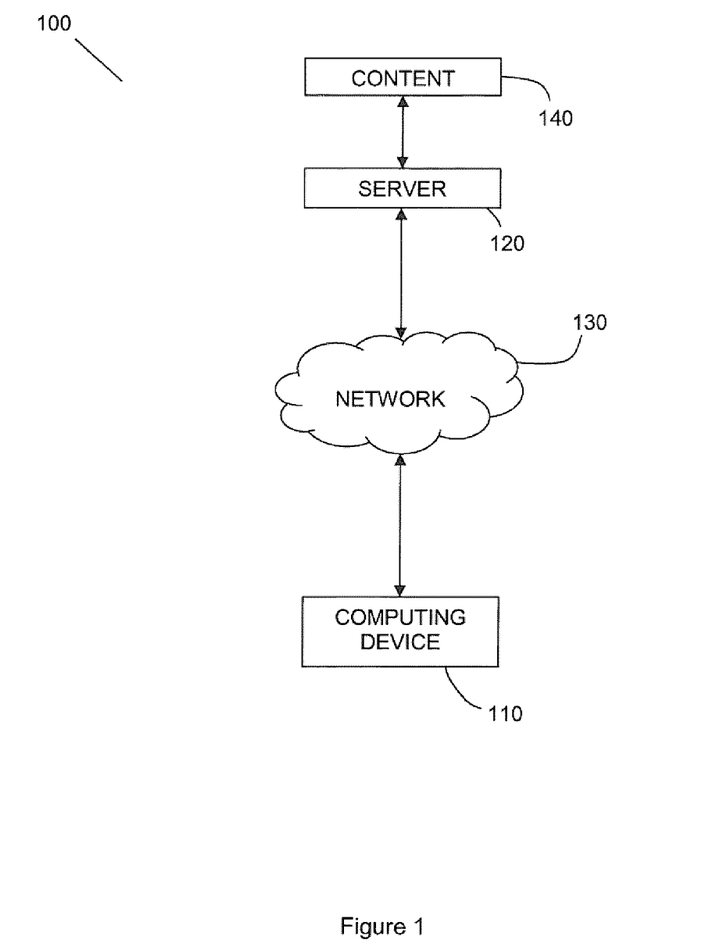
FIG. 1 is a schematic of a system for transporting data across a network to a computing device.

Referring now to FIG. 1, a schematic is provided of an example system for implementing embodiments of the present disclosure. System 100 includes first computing device 110 and second computing device 120 that are connectable over network 130. First and second devices may be geographically remote and connected by a wide area network such as the internet. Alternatively, first and second devices may connect over another network type, such as a local area network.

In one embodiment, first computing device 110 is a computing device running a client application, and second computing device 120 is a server. Server 120 may include, or be capable of obtaining, data to be transported to computing device 110 over network 130. In one example, server 120 may include or have access to media files, for example, from external storage device or database 140, that are available to be downloaded to computing device 110 in response to a request from computing device 110.

The processing steps for determining the suitable transport parameters based on the input parameters may be performed by a processor residing on the computing device. For example, the processing steps may be provided as an application that is stored in the memory of the computing device and may be executed with a processor on the computing device. In other embodiments, the processor for processing the input parameters and determining the transport parameters may reside on the server, or another computing device that is capable of communicating the transport parameters to the computing device.

Figure 2:
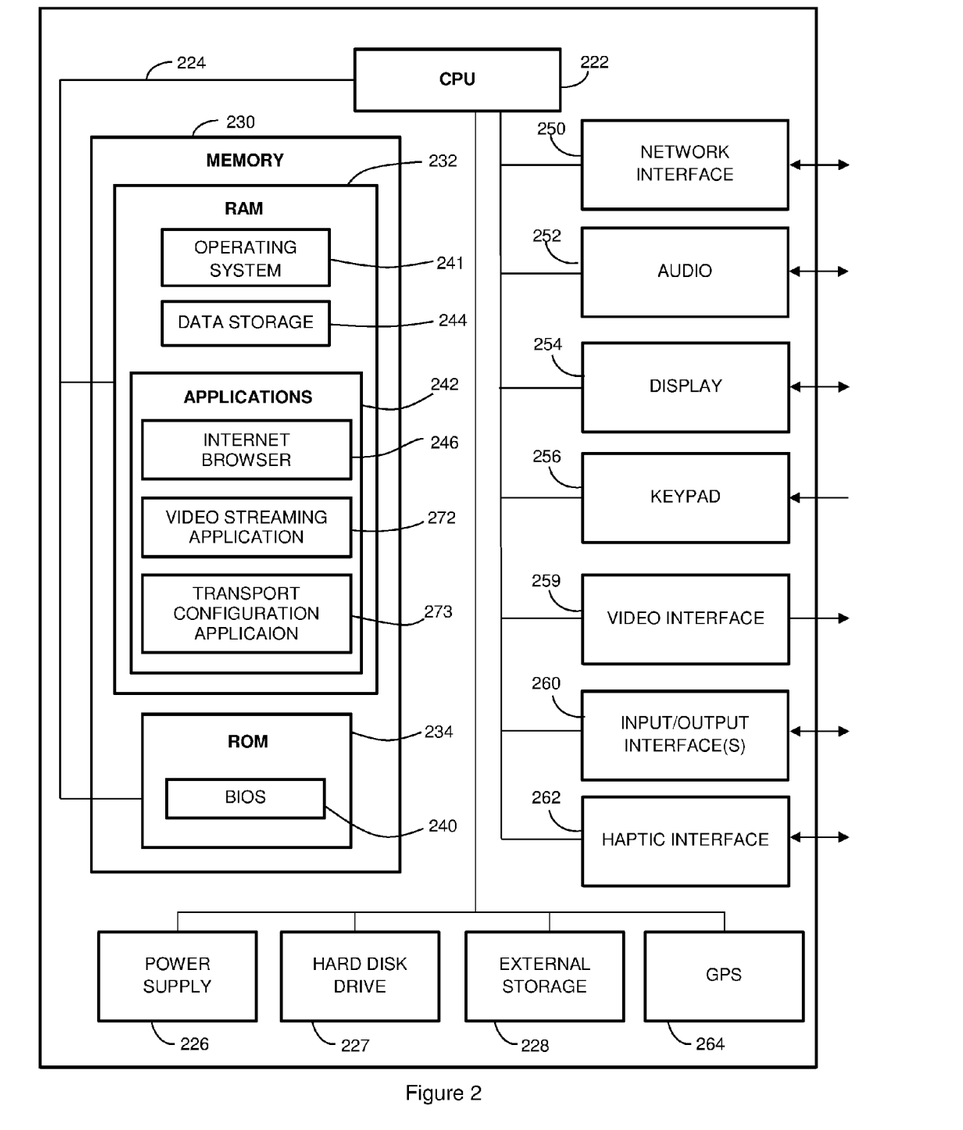
FIG. 2 illustrates an example of a computing device.

FIG. 2 illustrates an example embodiment of computing device 110. It is to be understood that the present illustration is not intended to suggest any limitation as to scope of use or functionality, as the systems and methods may be implemented in diverse general-purpose or special purpose computing environments. In some example implementations, computing device 110 may be a mobile computing device capable of media playback, such as a feature phone, a smart phone, a tablet, a netbook, and a laptop computer. Computing device 110 may include many more or less components than those shown in FIG. 2. However, the components shown are sufficient to disclose an illustrative embodiment for practicing the present disclosure.

As shown in the FIG. 2, example computing device 110 is a mobile computing device that includes a processing unit (CPU) 222 in communication with a mass memory 230 via a bus 224. Computing device 110 may also include a power supply 226, one or more network interfaces 250, an audio interface 252, video interface 259, a display 254, a keypad 256, a camera 258, an input/output interface 260, an optional global positioning systems (GPS) receiver 264 and an optional haptic interface 262. Power supply 226 provides power to computing device 110. A rechargeable or non-rechargeable battery may be used to provide power. The power may also be provided by an external power source, such as an AC adapter or a powered docking cradle that supplements and/or recharges a battery.

Computing device 110 may optionally communicate with a base station (not shown), or directly with another computing device 120. Network interface 250 includes circuitry for coupling computing device 110 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images.

Computing device 110 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the computing device. For example, the haptic interface may be employed to vibrate computing device 110 in a particular way when another user of a computing device is calling.

Optional GPS transceiver 264 can determine the physical coordinates of computing device 110 on the surface of the Earth, which typically outputs a location as latitude and longitude values. GPS transceiver 264 can also employ other geo-positioning mechanisms, including, but not limited to, triangulation, assisted OPS (AGPS), E-OTD, CI, SAI, ETA, BSS or the like, to further determine the physical location of computing device 110 on the surface of the Earth. It is understood that under different conditions, GPS transceiver 264 can determine a physical location within millimeters for computing device 110; and in other cases, the determined physical location may be less precise, such as within a meter or significantly greater distances. In one embodiment, however, a computing device may through other components, provide other information that may be employed to determine a physical location of the device, including for example, a MAC address, IP address, or the like.

In one embodiment, GPS transceiver 264 may operate with one or more other components of computing device 110 to connect to a network, such as network 130 of FIG. 1, to determine a physical location of computing device 110, which may be provided as an input parameter for the methods taught below.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of computing device 110. The mass memory also stores an operating system 241 for controlling the operation of computing device 110. It will be appreciated that this component may include a general purpose operating system such as a version of UNIX, or LINUX™, or a specialized client communication operating system such as J2ME, iOS™, Android™, Windows Mobile™, or the Symbian® operating system. The operating system may include, or interface with a Java virtual machine module that enables control of hardware components and/or operating system operations via Java application programs.

Memory 230 may further include data storage 244, which can be utilized by computing device 110 to store, among other things, applications 242 and/or other data. For example, data storage 244 may also be employed to store information that describes various capabilities of computing device 110. The information may then be provided to another device based on any of a variety of events, including being sent as part of a header during a communication, sent upon request, or the like. Moreover, data storage 244 may also be employed to store personal information including but not limited to address lists, contact lists, personal preferences, or the like. In one embodiment, data storage 244 may be configured to store information including, but not limited to user account information, user preferences, user history information, social network information, and the like. At least a portion of the information may also be stored on a disk drive or other storage medium within computing device 110, such as hard disk drive 227, external storage device 228, or the like. In one embodiment, a portion of the information may also be located remote to computing device 110, such as stored on server 120 shown in FIG. 1. Any one of applications 272 may also check for updated versions and prompt the user to install them, or automatically retrieve and install the updates.

Applications 242 may include computer executable instructions which, when executed by computing device 110, transmit, receive, and/or otherwise process messages (e.g., SMS, MMS, IM, email, and/or other messages), multimedia information, and enable telecommunication with another user of another computing device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Example applications 242 shown in FIG. 2 include browser 246, video streaming application 272. As noted above, applications 242 may also include an application, such as a transport configuration application 273, for performing the steps described in the embodiments provided below, and determining transport parameters by processing suitable input parameters.

It is to be understood that the aforementioned method may be performed by one or more applications running on the remote computing device. For example, in one embodiment, two or more applications running on the computing device may run instance or application for executing the aforementioned methods.

Browser 246 may be configured to receive and to send web pages, forms, web-based messages, and the like. Browser 246 may, for example, receive and display (and/or play) graphics, text, multimedia, audio data, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

In one embodiment, the central server additionally manages accounts for customers to allow the customers to store their personal information, payment information such as payment cards (e.g. debit and/or credit card), and download and/or order history. In one embodiment, the centralized server allows customers to link their social networking accounts with their account on the central servers or accounts on other social networks.

Embodiments of the disclosure can be implemented via the microprocessor(s) and/or the memory. For example, the functionalities described in the embodiments below can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

While some embodiments can be implemented in fully functioning computers and computer systems, various embodiments are capable of being distributed as a computing product in a variety of forms and are capable of being applied regardless of the particular type of machine or computer readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

A computer readable storage medium can be used to store software and data which when executed by a data processing system causes the system to perform various methods. The executable software and data may be stored in various places including for example ROM, volatile RAM, nonvolatile memory and/or cache. Portions of this software and/or data may be stored in any one of these storage devices.

Figure 3:
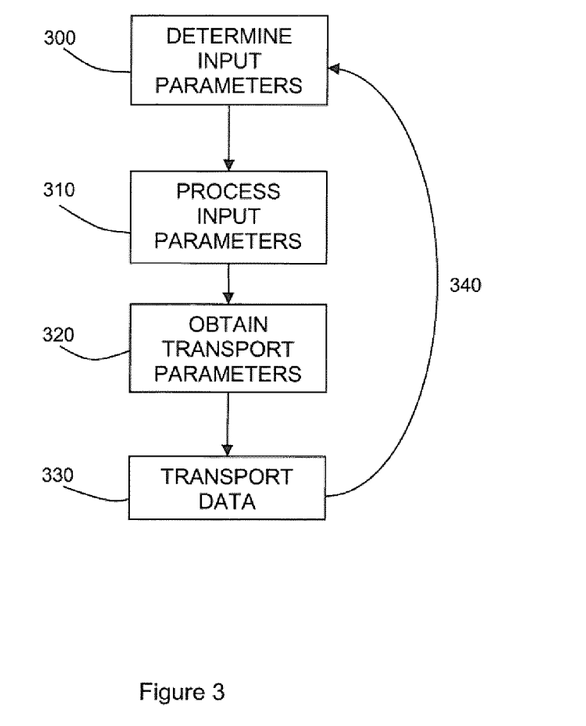
FIG. 3 is a flow chart illustrating a method of determining transport parameters for efficiently transporting data on a network.

Referring new to FIG. 3, an illustration is shown that provides an overview of a method for determining transport parameters for transporting data efficiently over a network with a reduced probability of latency or delay in data transmission. In step 300, input parameters are obtained for subsequent processing, where the processing is to be performed to determine suitable transport parameters based on the information provided in the input parameters.

Generally speaking, the input parameters may be associated with the computing device and the network over which the data is to be transported, such that the input parameters affect or otherwise relate to the capability of the first computing device to receive and process data from the second computing device. The input parameters may also relate to the capabilities or limitations of the computing device that is responsible for transmitting the data (e.g. a server). The input parameters are processed in step 310 in order to determine one or more transport parameters for improving the average data transmission rate during the delivery of data files (such as large media files that are streamed to a client application running on the computing device). After having determined the transport parameters, they are provided to (at least) the computing device in step 320 in order to configure the computing device for efficient data transfer. A subsequent data transfer request, and the resulting data transfer process, is subsequently performed in steps 330, based on the transport parameters obtained in step 320.

One example of an input parameter that may be provided is the maximum size of a data block or data file that may be received and cached by the computing device. In the case of HTTP transport, the input parameter may describe the HTTP capability of the computing device. For example, a HTTP capability input parameter may be provided or obtained indicating whether or not the computing device is configured to, and/or capable of, caching an entire HTTP response prior to providing the transmitted data to the client application.

Another example of an input parameter is a time duration over which an application (for example, a video streaming application) is configured to wait before determining that the network will not respond for an outstanding data transfer request (such as a request during an HTTP data session).

The input parameters may also specify the heap space of the computing device, which specifies how much memory is available for use by an application running on the computing device.

Another suitable input parameter is the current network data rate, which may be a parameter that changes over time. Accordingly, by providing the current network data rate as an input parameter, the present method enables the transport parameters to be dynamically adjusted.

In some devices, an operating system may provide a mechanism of obtaining the current network bandwidth through an application programming interface (API) call. Such an operating system keeps track of network bandwidth based on the network operation which it is performing. Other operating systems or platforms (J2ME platform is an example) do not have such a built-in mechanism for obtaining the network data rate. In these cases, the another application may be employed to determine this rate, for example, by downloading data from a remote server and feeding this information back to the processor.

In one example implementation in which the computing device is employed for the streaming of media files case, a streaming module that downloads video files over the network may also be employed to measure the time required to download such files. Based on file size and the time taken to download the files, the current network rate may be determined. This module this provides the algorithm with the network data rate on a continuous, intermittent, or periodic basis. The present method may use the latest measured value of the network data rate as an input parameter.

It is to be understood that the aforementioned input parameters are provided as examples, and that other input parameters may also or alternatively be provided for the determination of one or more transport parameters according to the present methods.

For example, in the example case of HTTP transmission, one example input parameter than may be employed is the size of the HTTP packet response the device operating system and/or the application platform of the device (for example, J2ME) can or will accept.

Another example input parameter related to HTTP transmission is a time duration, such as the minimum time duration, over which the device operating system and/or its application platform can read off the HTTP response and provide it (pass it up) to application.

Another example of an input parameter related to HTTP transmission is a time duration, such as the maximum time duration, over which a carrier's network will allow an open HTTP session and let data flow through it. This input parameter is expected to vary from carrier to carrier, and/or region to region. This input parameter may also vary from time to time for the same carrier in the same region.

As noted above, the one or more transport parameters determined in step 320 are selected to configure the computing device for efficient data transfer with reduced latency and/or delay.

One example of a transport parameter that may be determined as above is the number of bytes (or, for example, the maximum number of bytes) for an application to request (such as a HTTP request).

A transport parameter may also be provided that prescribes or is associated with a suitable time delay to wait before inferring a network timeout. For example, a suitable transport parameter is a timeout value for a watchdog timer that the application can use to determine if a network operation should be aborted due to inactivity.

It is to be understood that these transport parameters are provided as examples, and that other transport parameters may also or alternatively be provided in response to the input. Other suitable transport parameters are provided in the examples below.

The preceding input example parameters (namely the network data rate, the heap space of the computing device, the maximum time duration over which the application is configured to wait before determining that the network will not respond to an outstanding data transfer session, and the size of a data block or data file that may be received by the computing device) may, in one example, be processing according to the example calculation provided below:

Many of the above input parameters depend on variables that change dynamically (for example, by the hour) and by the location of the computing device. Accordingly, in one embodiment, the transport parameters are obtained based on input parameters that are continuously, intermittently, or periodically updated in time. This is shown by step 340 of FIG. 3, where after having transported a given data block as per the transport parameters determined in step 320, the process is repeated and the input parameters are re-assessed in step 300 based on current network conditions and characteristics. This enables the transport parameters to be dynamically tuned based on the dynamic network behaviour and device capability.

In one embodiment, the input parameters may include information associated previously transmitted data, such as information relating to successful data transfer and network timeouts that were previously encountered. This information may be, in one example, employed in a reward/punish scheme, where the results of a preceding transmission request are employed to either increase, decrease, or leave unchanged, one or more transport parameters. For example, if the preceding transmission request resulted in successful transmission, one or more transport parameters are increased (or "rewarded"). In contrast, if the preceding transmission request resulted in undelivered data (for example, no data), the one or more transport parameters may be decreased (or "punished"). This example embodiment method therefore provides for the tuning, configuration, and/or reconfiguration of the network and computing device based on such reward/punishment values.

Figure 4:
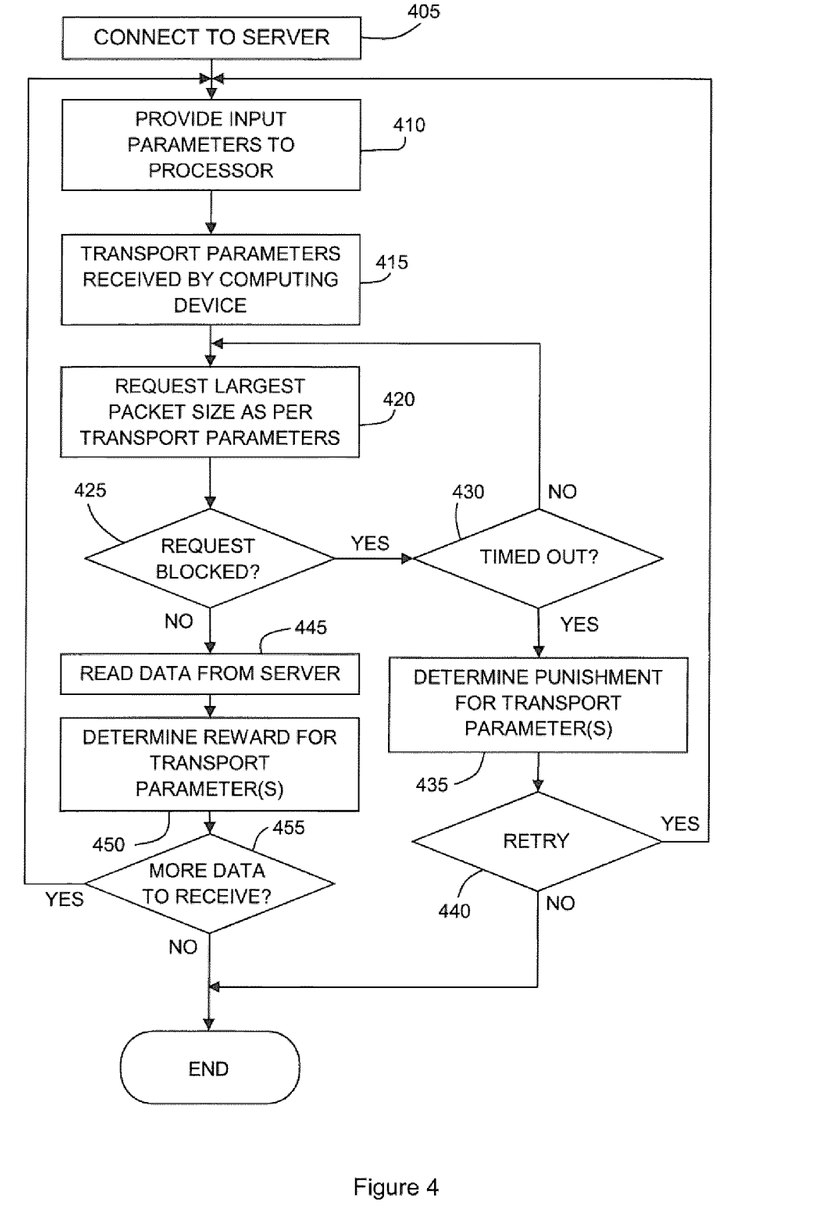
FIG. 4 shows a flow chart illustrating an example method of efficiently downloading data over HTTP.

Referring now to FIG. 4, a flow chart is provided that illustrates an example embodiment in which one or more transport parameters are provided for the efficient transfer of time-sensitive data over HTTP using a reward/punishment scheme. In the example method shown in FIG. 4, reward and punishment information are continuously fed to the application for the determination of suitable real-time transport parameters.

In step 405, the computing device connects to the server. The input parameters are provided, in step 410, to a processor that is programmed to determine suitable transport parameters according to the aforementioned methods. In step 415, the transport parameters are obtained by the computing device in order to configure the computing device for efficient transport. As shown in the Figure, example transport parameters provided to the computing device include the packet size and the timeout interval.

The computing device may then, in step 420, request transport of a packet of data, in which the size of the requested pack is based on the transport parameters identified in the previous step.

In step 425, after having made the request, a determination is made as to whether or not the request is blocked. For example, a network application may have committed a read operation for receiving data from the network. This may block the caller until all the data is received, where the call unblocks when there is sufficient data to be received. If the caller is blocked, the method can employ a "watchdog" type of functionality that makes sure the read is not blocked for a long period of time. Block 430 in FIG. 4 is therefore an example of such a watchdog functionality that is checking for a timeout. If a timeout is detected, the read loop can be broken, and the transport parameters can be modified (punished), and another read operation can be performed with the modified transport parameters. If a timeout is detected consecutively for a configured number of times, step 440 may further include making a determination there is no point attempting to perform further read operations. Notification may then be provided that there is a non-recoverable network failure.

If the request is blocked, and the timeout limit has been exceeded in step 430, then a determination is made that the request has not been successful, and in step 435, a determination is made of a modification, or "punishment", for one or more transport parameters. As described further below, an example of a "punishment" is a reduction in the value of the maximum packet size. The degree of modification to be made to the transport parameter, or "punishment" of the transport parameter, may be associated with the number of bytes that were received prior to timeout.

If the request is not abandoned in step 440, and is to be retried, the transport parameters updated in step 415 will include the modification ("punishment") of the one or more transport parameters. As shown in the Figure, the input parameters may also be updated in step 410 to reflect any changes in the network conditions.

If, on the contrary, the data is read in full by the server in step 445, a modification or "reward" to be made to the transport parameter is determined in step 450. As in the case of a "punishment" described above, the "reward" may be associated with the number of bytes that were received. If more data is to be received (e.g. as additional packets), step 410 is repeated, with the reward applied to newly determined transport parameters.

Figure 5:
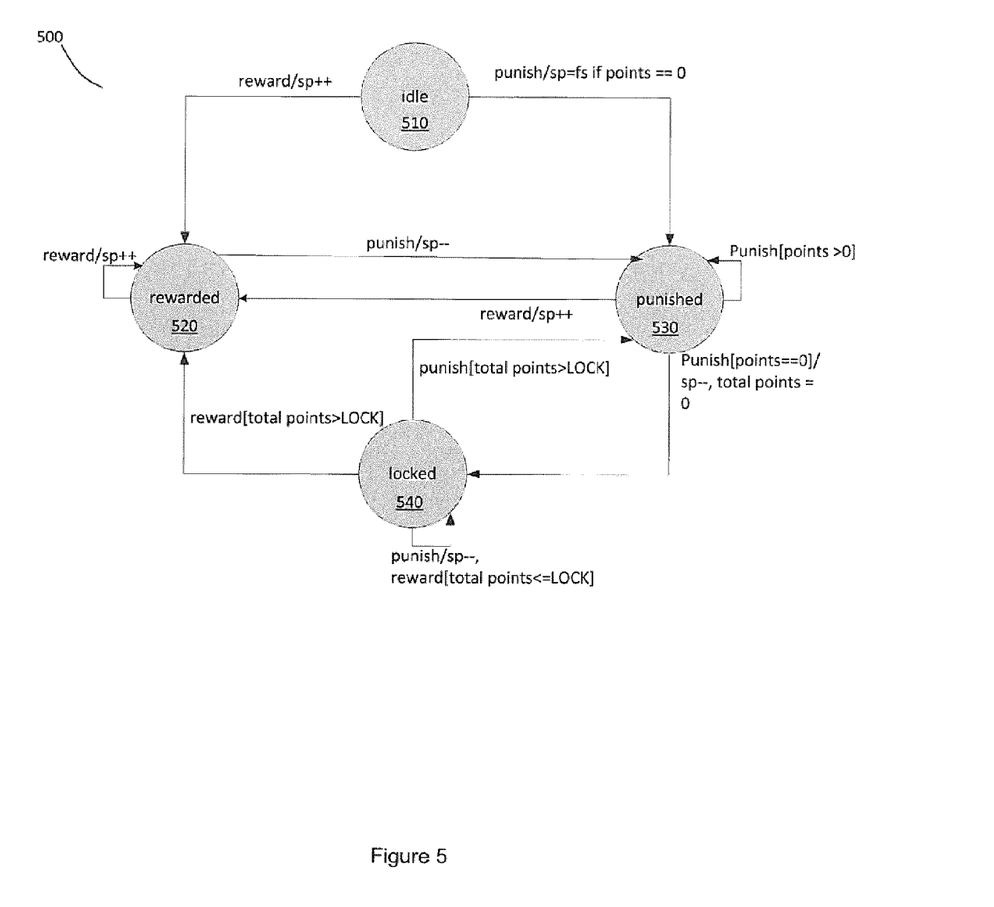
FIG. 5 illustrates a state machine associated with the method shown in FIG. 4.

FIG. 5 provides an illustration of an example state machine 500 for the utilization and determination of rewards and punishments in an example involving HTTP data delivery. In the present example, rewards (state 520) or punishments (state 530) are applied to the HTTP packet size, henceforth referred to as the spot value (shown as "sp" in state machine 500), which is a transport parameter.

The state machine begins in the idle state 510 with an initially prescribed spot value. As noted above, the determination of a transport parameter is made based on input parameters. In the present example, the initial value of the transport parameter, spot value, depends on the device's heap size, which is an input parameter to the method. For example, the step of processing the input parameter to determine a suitable transport parameter may involve determining an initial value of the spot value to be a percentage (such as 15%) of the total device heap size available to the application.

Another transport parameter, the initial watchdog timeout value, may be determined based on other input parameters such a parameter that indicates the device's ability to cache the entire HTTP response and the current network bandwidth. For example, the watchdog timeout value may depend on the (1) network rate and (2) the contract of device's network API with respect to how much data the underlying transport buffers before indicating to the caller that data is ready to be read. In the specific example case of Nokia series 40 3rd edition devices, the operating system network API will block the caller until the entire HTTP packet is fully received. For this type of device, the watchdog timeout has to be at least the ratio of: the amount of data requested to be downloaded in an individual HTTP request (the spot value) and the current network data rate. In contrast, some device APIs (e.g., the Java platform on Nokia series 60 devices) will unblock the caller as soon as it is receiving data over the network irrespective of how much data was asked in a single HTTP request. For this type of device, watchdog time out can be set to a much smaller value.

Additionally, the following additional parameters may also be determined: a minimum possible value (floor) for the spot value and a maximum possible value (ceiling) for the spot value. In the above example pertaining to the Nokia Series 40 $3^{rd}$ edition phone), the inventors have found that the ceiling can be set to about 30% of total heap, whereas the floor can be set to about 8K. As noted above, on the Nokia S40 3rd edition device, the platform buffers the entire HTTP packet response in heap memory before unblocking the caller's read request. Because the ceiling is the maximum that will be requested in a single HTTP request, this must not exceed the total heap available. 30% of heap is an engineering choice so that other part of the app can still function properly using the remaining 70% of the heap. It will be understood that the specific selection of an appropriate portion of the heap size depends on how memory hungry the other part of the application is. It will be understood that while, generally, speaking, there is no minimum (floor), the smaller the floor is, more network operation is required to download a file (e.g. A video clip) and more time it takes for the algorithm of the present method to converge to stable transport parameters.

Referring again to the state machine shown in FIG. 5, having determined the appropriate transport parameters, the computing device then attempts to download an amount of bytes based on the spot value. If the attempt is successful and the computing device receives the requested number of bytes (prior to the expiry of the watchdog timeout clock), a "reward" is given in state 520 based on the amount of bytes downloaded during the read operations, thereby causing the spot value to increase. In FIG. 5, the number of bytes are shown as "points" that are utilized as potential rewards to be applied to a transport parameter of the algorithm.

In one example implementation, the spot value can be increased by using a binary-search-like operation, for example, by choosing the middle value between its current spot value to its ceiling value. In other words, the transport parameter can be increased by an amount that depends on the value of the transport parameter. Such increment can be defined as a fast acceleration. Another approach is to increase the spot value by a static amount, such as 10K. This is referred to as a slow acceleration.

In one embodiment, the method may include the step of determining when to employ fast acceleration or slow acceleration. The method may be performed such that fast acceleration is initially employed. If a series of consecutive negative modifications ("punishments") occur, the method may switch to slow acceleration when a subsequent successful request is made. In such a case, for example, the ceiling may have been too high for the current network condition. After having operated in slow acceleration, the method may switch to fast acceleration again as it reaches close to the ceiling.

When the transport parameters are "punished" at the idle state with 0 points (meaning a network timeout has occurred and the application has received no data), this suggests that the initial spot value may be too large. In one example, the method of applying the punishment may involve making a correction to the spot value by giving it a value close to or equal to the floor value called a "first strike" value (fs in the figure). In another example, the acceleration may be switched from fast acceleration to slow acceleration at this point.

In one embodiment, as shown referring to state 540, consecutive unsuccessful transmission requests, such as consecutive punishments with 0 points, will cause the state machine to switch to the locked state. In one example, once the state machine is in the locked state, the algorithm must accumulate enough rewards to revert back to an unlocked state. At locked state, a reward will not increase the spot value; only the total accrued reward (for example, provided as "points") will increase. Once the total accrued rewards or points exceed a predefined lock value, the algorithm will allow switching to either a reward or punished state. In one example implementation, the lock value may be set to a selected percentage of the parameter ceiling, such as 50% of the ceiling. In another embodiment, the locked state is maintained until a pre-selected number of successful requests have been performed.

A main principle of the locked state is to identify a "sweet spot" in a conservative manner. The lock value thus causes the algorithm to switch from a conservative mode and be aggressive if the network behaves positively.

Although the preceding methods have been disclosed with reference to example network configurations and devices, it is to be understood that the methods described herein can be applicable to any application for finding the improved or optimal values of operational network parameters that vary dynamically based on time, location or other attributes.

For example, many network operators use NAT (network address translation) and use a small set of IP addresses for identifying a much larger number of mobile devices. When such a mobile device accesses a remote server, the network needs to keep a NAT mapping in its NAT equipment. For scalability, these NAT mappings expire after a given period of inactivity. Devices that use long-lasting TCP connections will get dropped for inactivity in such scenarios. The preceding methods can be used to identify such timeout parameters dynamically to keep such long lasting TCP connection alive, for example, by sending "keep alive" messages at specific intervals. As such a "specific interval" is a transport parameter, the present methods can be employed to determine such a specific interval.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A computer implemented method of configuring a first computing device for transmitting data across a network between a second computing device and the first computing device, the method comprising:

transmitting a request, from the first computing device, for transmission of data from the second computing device to the first computing device, wherein the request is based on one or more of transport parameters;

employing, on the first computing device, a watchdog timer for detecting a network timeout; and in the event that the requested data is not received prior to the expiry of a timeout value of the watchdog timer, modifying one or more of the one or more transport parameters to improve subsequent data transmission;

wherein the modification applied to the one or more of transport parameters is based on a number of bytes received in response prior to expiry of the watchdog timer, and wherein the number of bytes received is less than the number of requested bytes;

the method further comprising, after having performed one or more additional unsuccessful requests in which the number of bytes received is less than the number of requested bytes:

maintaining the values of the one or more modified transport parameters in a locked state for one or more subsequent successful transmission requests;

after performing each successful request, adding one or more points to a reward value; and increasing the value of the one or more of the transport parameters after the reward value exceeds a pre-selected threshold, thereby releasing the one or more of transport parameters from the locked state.

2. The method according to claim 1, wherein the modification includes decreasing the value of a selected transport parameter.

3. The method according to claim 2, wherein the number of bytes received prior to expiry of the watchdog timer is zero, and wherein the modification includes setting the value of the selected transport parameter to a pre-selected value.

4. The method according to claim 3, wherein the pre-selected value is a minimum value of the selected transport parameter.

5. The method according to claim 1, wherein the number of points added to reward value after performing a given successful request is dependent on the number of bytes received in response to the request.

6. The method according to claim 1, further comprising repeating the transmission of the request after modifying the one or more of transport parameters.

7. The method according to claim 1, wherein in the event that the number of bytes received prior to expiry of the watchdog timer is equal to the number of requested bytes, the method further comprises:
increasing the value of a selected transport parameter for improving the efficiency of subsequent data transmission.

8. The method according to claim 7, wherein the selected transport parameter is increased by a fixed amount.

9. The method according to claim 7, wherein the selected transport parameter is increased by a fixed amount when a first successful request is made after having made one or more unsuccessful requests.

10. The method according to claim 7, wherein the selected transport parameter is increased by an amount that is dependent on the selected transport parameter.

11. The method according to claim 7, wherein the selected transport parameter is increased by an amount that is dependent on the selected transport parameter after having performed two or more successful requests.

12. The method according to claim 1, wherein the watchdog timer is implemented by an application executable on the first computing device to determine if a network operation should be aborted due to inactivity.

13. The method according to claim 1, further comprising obtaining updated values of one or more input parameters and processing the updated values of the one or more input parameters to determine updated values of one or more transport parameters prior to making a subsequent request.

14. The method according to claim 13, wherein the one or more of transport parameters are initially obtained by:
determining one or more input parameters that affect an average data transmission rate between the second computing device and the first computing device; and
processing the input parameters to determine the one or more transport parameters.

15. The method according to claim 14, wherein one of the input parameters is a maximum size of a file that may be received and cached by the first computing device.

16. The method according to claim 14, wherein one of the input parameters is associated with the ability of the first computing device to cache an entire HTTP response.

17. The method according to claim 14, wherein one of the input parameters is a time duration over which a client application, executable on the first computing device, is configured to wait before determining that the network will not respond to an outstanding data transmission request.

18. The method according to claim 14, wherein one of the input parameters is a heap space of the first computing device.

19. The method according to claim 14, wherein one of the input parameters is a data rate of the network.

20. The method according to claim 14, wherein one of the input parameters is a size of an HTTP packet response that is compatible with one or more of an operating system of the first computing device and an application platform of the first computing device.

21. The method according to claim 14, wherein one of the input parameters is a minimum time duration over which one or more of an operating system of the first computing device and an application platform of the first computing device can read an HTTP response and provide it to an application executable on the first computing device.

22. The method according to claim 14, wherein one of the input parameters is a maximum time duration over which the network will allow an open HTTP session.

23. The method according to claim 1 wherein the selected transport parameter is a prescribed number of bytes to be requested for transmission.

* * * * *